(12) United States Patent
Lee

(10) Patent No.: US 10,681,275 B2
(45) Date of Patent: Jun. 9, 2020

(54) DIGITAL PHOTOGRAPHING METHOD AND APPARATUS FOR CAPTURING IMAGES BASED ON DETECTED MOTION VECTORS

(71) Applicant: SAMSUNG ELECTRONICS CO., LTD., Suwon-si, Gyeonggi-do (KR)

(72) Inventor: Seung-yun Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 438 days.

(21) Appl. No.: 14/883,128

(22) Filed: Oct. 14, 2015

(65) Prior Publication Data

US 2016/0037072 A1 Feb. 4, 2016

Related U.S. Application Data

(63) Continuation of application No. 13/162,959, filed on Jun. 17, 2011, now Pat. No. 9,185,293.

(30) Foreign Application Priority Data

Jul. 27, 2010 (KR) .................. 10-2010-0072480

(51) Int. Cl.
*H04N 5/228* (2006.01)
*H04N 5/232* (2006.01)
*G06T 7/20* (2017.01)

(52) U.S. Cl.
CPC .......... *H04N 5/23254* (2013.01); *G06T 7/20* (2013.01); *H04N 5/23222* (2013.01); *H04N 5/23293* (2013.01)

(58) Field of Classification Search
CPC .......... H04N 5/23248; H04N 5/23258; H04N 5/23254; H04N 5/23287; H04N 5/23264
See application file for complete search history.

(56) References Cited

U.S. PATENT DOCUMENTS

| | | |
|---|---|---|
| 5,949,481 A | 9/1999 | Sekine et al. |
| 7,697,769 B2 | 4/2010 | Baba et al. |
| 8,106,951 B2 | 1/2012 | Chou et al. |
| 8,395,679 B2 | 3/2013 | Kang et al. |
| 8,406,464 B2 | 3/2013 | Karazi |
| 8,411,154 B2 | 4/2013 | Shimizu |
| 2002/0080425 A1 | 6/2002 | Itokawa |
| 2005/0179784 A1 | 8/2005 | Qi |
| 2005/0265453 A1 | 12/2005 | Saito |
| 2006/0066744 A1 | 3/2006 | Stavely et al. |
| 2006/0177145 A1* | 8/2006 | Lee .................. G06K 9/40 382/255 |
| 2008/0036867 A1 | 2/2008 | Lin et al. |

(Continued)

FOREIGN PATENT DOCUMENTS

JP    2008-294737 A    12/2008

OTHER PUBLICATIONS

Office Action issued in related application KR 10-2010-0072480, with English language translation, Mar. 15, 2016, 11 pages.

*Primary Examiner* — Sinh Tran
*Assistant Examiner* — Selam T Gebriel
(74) *Attorney, Agent, or Firm* — Jefferson IP Law, LLP

(57) ABSTRACT

A digital photographing method and apparatus include determining a motion vector of an object in a preview image, determining whether the motion vector meets a predetermined condition and, when it does, generating an image capturing signal to photograph a scene desired by a user.

18 Claims, 18 Drawing Sheets

(56) References Cited

U.S. PATENT DOCUMENTS

| | | |
|---|---|---|
| 2008/0056613 A1 | 3/2008 | Hatanaka et al. |
| 2008/0240617 A1 | 10/2008 | Douniwa |
| 2008/0291285 A1 | 11/2008 | Shimizu |
| 2008/0294400 A1* | 11/2008 | Czora .............. G06N 3/004 703/6 |
| 2009/0002501 A1* | 1/2009 | Silsby ............. G11B 31/006 348/208.16 |
| 2009/0051777 A1 | 2/2009 | Lee et al. |
| 2009/0102935 A1* | 4/2009 | Hung .............. H04N 5/235 348/222.1 |
| 2009/0129688 A1 | 5/2009 | Baba et al. |
| 2009/0252374 A1 | 10/2009 | Ishikawa et al. |
| 2009/0257623 A1* | 10/2009 | Tang .............. H04N 7/147 382/107 |
| 2009/0262230 A1 | 10/2009 | Sugiura |
| 2009/0316044 A1 | 12/2009 | Chen et al. |
| 2010/0020244 A1 | 1/2010 | Mitsuya et al. |
| 2010/0080417 A1 | 4/2010 | Qureshi et al. |
| 2010/0231731 A1 | 9/2010 | Motomura et al. |
| 2010/0232646 A1 | 9/2010 | Takeuchi |
| 2010/0265344 A1 | 10/2010 | Velarde et al. |
| 2010/0271484 A1 | 10/2010 | Fishwick et al. |
| 2010/0271494 A1 | 10/2010 | Miyasako |
| 2010/0295953 A1 | 11/2010 | Torii et al. |
| 2011/0001884 A1 | 1/2011 | Iketani |
| 2011/0019013 A1 | 1/2011 | Lin et al. |
| 2011/0085049 A1 | 4/2011 | Dolgin et al. |
| 2011/0211108 A1 | 9/2011 | Pollard |
| 2011/0298839 A1 | 12/2011 | Nakanishi |

\* cited by examiner

| B11 | B12 | B13 | ⋯ | | |
|---|---|---|---|---|---|
| B21 | B22 | | ⋯ | | |
| $V_j^1$ → | | | | | |
| ⋮ | ⋮ | ⋮ | ⋯ | | |
| | | | | | |
| | | | | | |
| | | | | | |
| | | | | | |

I12

DIGITAL PHOTOGRAPHING METHOD AND APPARATUS FOR CAPTURING IMAGES BASED ON DETECTED MOTION VECTORS

CROSS-REFERENCE TO RELATED PATENT APPLICATIONS

This application is a continuation of U.S. patent application Ser. No. 13/162,959, filed Jun. 17, 2011, which claims the benefit of Korean Patent Application No. 10-2010-0072480, filed on Jul. 27, 2010, in the Korean Intellectual Property Office, the disclosures of which are incorporated herein in their entirety by reference.

BACKGROUND

Field

Embodiments relate to a digital photographing method and apparatus.

Description of the Related Art

Taking a series of consecutive photographs is often used to capture a desired scene by a photographer. However, consecutive photographing generally uses predetermined intervals between shots, sometimes making it difficult for the photographer to capture the desired scene.

SUMMARY

The herein described method and apparatus provide a digital photographing method and a digital photographing apparatus for effectively capturing a scene desired by a user.

According to an embodiment, a digital photographing method includes generating a frame image including an object; locating the object in the frame image; detecting a motion vector of the object; determining whether the motion vector meets a predetermined condition; and if the motion vector meets the predetermined condition, generating an image capturing signal.

The motion vector of the object may be a sum vector of motion vectors of an object region including at least a portion of the object.

The object may include a plurality of objects, the locations of at least some of the plurality of objects may be determined, and motion vectors of one or more of the plurality of objects may be detected.

The digital photographing method may further include detecting a distance between the motion vectors of the plurality of objects, wherein it may be determined whether the distance is within a reference distance range, and, if the distance is within the reference distance range, the image capturing signal may be generated. It may be determined whether the motion vectors of the plurality of objects contact each other, and based on the determination, the image capturing signal may be generated.

The digital photographing method may further include determining directions of the motion vectors of the plurality of objects.

If the directions of the motion vectors of the plurality of objects are different from each other and the motion vectors meet a predetermined condition, the image capturing signal may be generated.

If the directions of the motion vectors of the plurality of objects are the same and the motion vectors meet a predetermined condition, the image capturing signal may be generated.

The digital photographing method may further include dividing the frame image into a plurality of blocks, wherein motion vectors of the object may be detected in each of the plurality of blocks.

The motion vector of each of the plurality of blocks may be a sum vector of motion vectors of the object in a corresponding block.

According to another embodiment, a first frame image including an object and a second frame image including the object may be generated, each of the first frame image and the second frame image may be divided into a plurality of blocks, motion vectors of the object in each of the plurality of blocks may be detected, it may be determined whether the motion vectors converge between the first frame image and the second frame image, and, if the motion vectors converge, the image capturing signal may be generated.

Alternatively, a first frame image and a second frame image including the object may be generated, each of the first frame image and the second frame image may be divided into a plurality of blocks, motion vectors of the object in each of the plurality of blocks may be detected, it may be determined whether the motion vectors diverge between the first frame image and the second frame image, and if the motion vectors diverge, the image capturing signal may be generated.

A first frame image and a second frame image including the object may be generated, each of the first frame image and the second frame image may be divided into a plurality of blocks, motion vectors of the object in each of the plurality of blocks may be detected, it may be determined whether the motion vectors are combined between the first frame image and the second frame image, and, if the motion vectors are combined, the image capturing signal may be generated.

A first frame image and a second frame image including the object may be generated, each of the first frame image and the second frame image may be divided into a plurality of blocks, motion vectors of the object in each of the plurality of blocks may be detected, it may be determined whether the motion vectors are separated from each other between the first frame image and the second frame image, and, if the motion vectors are separated from each other, the image capturing signal may be generated.

According to another aspect, there is provided a tangible computer readable storage medium having stored thereon a computer program for implementing the digital photographing method.

According to another aspect, there is provided a digital photographing apparatus including a frame imaging unit that generates a frame image including an object; an object locating unit that locates the object in the frame image; a motion vector detecting unit that detects a motion vector of the object; a condition determining unit that determines whether the motion vector meets a predetermined condition; and an image capturing control unit that generates an image capturing signal if the motion vector meets the predetermined condition.

The motion vector detecting unit may detect a sum vector of motion vectors of an object region including at least a portion of the object.

The object may include a plurality of objects, the frame imaging unit may generate a frame image including the plurality of objects, the object locating unit may locate at least some of the plurality of objects, and the motion vector detecting unit may detect motion vectors of one or more of the plurality of objects.

The digital photographing apparatus may further include a distance detecting unit that detects a distance between the motion vectors of the plurality of objects, wherein the condition determining unit may determine whether the distance is within a reference distance range, and the image capturing control unit may generate the image capturing signal, if the distance is within the reference distance range.

The condition determining unit may determine whether the motion vectors of the plurality of objects contact each other, and the image capturing control unit may generate the image capturing signal, if the motion vectors of the plurality of objects contact each other.

The digital photographing apparatus may further include a direction determining unit that determines directions of the motion vectors of the plurality of objects.

If the directions of the motion vectors of the plurality of objects are different from each other and the motion vectors meet a predetermined condition, the image capturing control unit may generate the image capturing signal.

If the directions of the motion vectors of the plurality of objects are the same and the motion vectors meet a predetermined condition, the image capturing control unit may generate the image capturing signal.

The digital photographing apparatus may further include an image dividing unit that divides the frame image into a plurality of blocks, wherein the motion vector detecting unit may detect motion vectors of the object in each of the plurality of blocks.

The motion vector detecting unit may detect a sum vector of motion vectors of the object in a corresponding block.

The frame imaging unit may generate a first frame image and a second frame image including the object, the image dividing unit may divide each of the first frame image and the second frame image into a plurality of blocks, the motion vector detecting unit may detect motion vectors of the object in each of the plurality of blocks, the condition determining unit may determine whether the motion vectors converge between the first frame image and the second frame image, and, if the motion vectors converge, the image capturing control unit may generate the image capturing signal.

The frame imaging unit may generate a first frame image and a second frame image including the object, the image dividing unit may divide each of the first frame image and the second frame image into a plurality of blocks, the motion vector detecting unit may detect motion vectors of the object in each of the plurality of blocks, the condition determining unit may determine whether the motion vectors diverge between the first frame image and the second frame image, and, if the motion vectors diverge, the image capturing control unit may generate the image capturing signal.

The frame imaging unit may generate a first frame image and a second frame image including the object, the image dividing unit may divide each of the first frame image and the second frame image into a plurality of blocks, the motion vector detecting unit may detect motion vectors of the object in each of the plurality of blocks, the condition determining unit may determine whether the motion vectors are combined between the first frame image and the second frame image, and, if the motion vectors are combined, the image capturing control unit may generate the image capturing signal.

The frame imaging unit may generate a first frame image and a second frame image including the object, the image dividing unit may divide each of the first frame image and the second frame image into a plurality of blocks, the motion vector detecting unit may detect motion vectors of the object in each of the plurality of blocks, the condition determining unit may determine whether the motion vectors are separated from each other between the first frame image and the second frame image, and, if the motion vectors are separated from each other, the image capturing control unit may generate the image capturing signal.

BRIEF DESCRIPTION OF THE DRAWINGS

The above and other features and advantages of the herein disclosed apparatus and methods will become more apparent in view of exemplary embodiments described with reference to the attached drawings in which:

FIGS. 15 through 22 are diagrams illustrating exemplary relationships between previous frame images and current frame images in the digital photographing method of FIG. 14.

DETAILED DESCRIPTION

Figure 1:
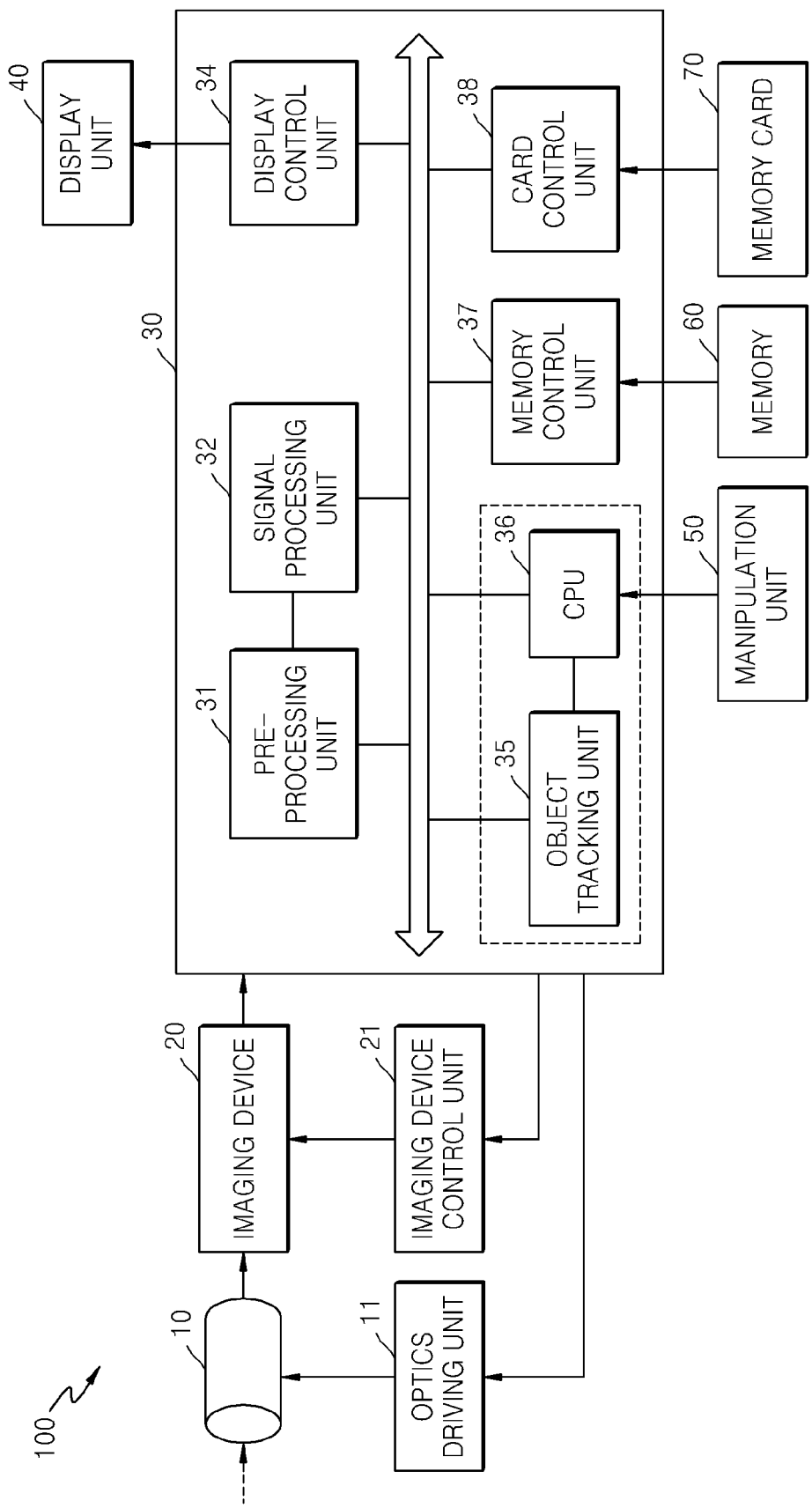
FIG. 1 is a block diagram of a digital photographing apparatus according to an exemplary embodiment.

The following description and the attached drawings are provided for better understanding of the disclosed exemplary embodiments. Descriptions of techniques or structures related to the described embodiments which would be obvious to one of ordinary skill in the art may be omitted.

The specification and the drawings are provided for the purpose of illustration and not limitation. Accordingly, the scope of the invention is determined by the appended claims and their equivalents.

Although terms like "first" and "second" may be used to describe various elements, the elements are not limited to these terms. Such terms are used only to differentiate one element from another element.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments will now be described more fully with reference to the accompanying drawings, in which like reference numerals designate like parts. In the drawings, the thicknesses of layers and/or regions may be exaggerated for clarity.

FIG. 1 is a block diagram of an exemplary digital camera 100 as an example of a digital photographing apparatus according to an illustrative embodiment. However, the digital photographing apparatus is not limited to a digital camera, and may alternatively take the form of other types of digital imaging devices, such as a camera phone, a digital camera, a digital camcorder, a personal digital assistant (PDA), a TV, a mobile phone, a portable multimedia player (PMP), or the like. Referring to FIG. 1, the digital photographing apparatus 100 may include an optics unit 10, an optics driving unit 11 for driving the optics unit 10, an imaging device 20, an imaging device control unit 21, a digital signal processor (DSP) 30, a display unit 40, a manipulation unit 50, a memory 60, and a memory card 70.

The optics unit 10 may include a lens for concentrating optical signals, an iris for controlling an amount of the optical signals, and a shutter for controlling input of the optical signals. The lens may include a zoom lens for narrowing or widening a picture angle according to focal lengths, and/or a focus lens for focusing on an object. Each of the lenses as stated above may be either an individual lens or a collection of a plurality of lenses. The shutter may be a mechanical shutter, in which a screen moves, for example, in a vertical direction. Alternatively, supply of electric signals to the imaging device 20 may be controlled instead of arranging a shutter unit.

The optics driving unit 11 for driving the optics unit 10 may perform relocation of the lens, opening/closing of the iris, and operation of the shutter for performing operations such as auto-focusing, auto-exposure, iris controlling, zooming, and focus changing. The optics driving unit 11 may receive a control signal from the DSP 30 and control the optics unit 10 according to the control signal.

The imaging device 20 includes a photoelectric conversion device that receives an optical signal input via the optics unit 10 and converts the optical signal to an electric signal. Examples of the photoelectric conversion device are a charge-coupled device (CCD) sensor array and a complementary metal-oxide semiconductor (CMOS) sensor array. Furthermore, the imaging device 20 may include a correlated double sampling (CDS)/amplifier (AMP) that eliminates low frequency noises included in an electric signal output by the imaging device 20 and amplifies the electric signal to a predetermined level. Furthermore, the imaging device 20 may further include an analog-digital (AD) converter that performs digital conversion on an electric signal output by the CDS/AMP to generate a digital signal. Illustratively, the imaging device 20 and the components stated above are included in a single block in FIG. 1. However, the present invention is not limited thereto, and the imaging device 20 and the components stated above may be either included in separate blocks or included in the DSP 30.

The optics driving unit 11 and the imaging device control unit 21 may be controlled according to a timing signal supplied by a timing generator (TG). Although not shown, the TG may be included in the DSP 30. However, the present invention is not limited thereto. For example, in a digital single lens reflex (DSLR) camera, the TG may be arranged in a lens unit attached to a body. The TG outputs a timing signal to the imaging device 20 to control a period of time for exposure of a plurality of pixels of the photoelectric conversion device or control read-out of electric charges. Accordingly, the imaging device 20 may provide image data corresponding to a frame image according to a timing signal provided by the TG.

An image signal provided by the imaging device 20 is input to a pre-processing unit 31 of the DSP 30. The pre-processing unit 31 may perform calculations for accomplishing certain functions, such as automatic white balance (AWB), automatic exposure (AE), and automatic focusing (AF). Results of the calculations for AWB and AE may be fed back to the imaging device control unit 21 so that the imaging device 20 may acquire an image signal with suitable color outputs and suitable exposure levels from the imaging device 20. Furthermore, the results of the calculations for AWB and AE may control opening/closing of the iris and shutter speed by driving an iris driving motor and a shutter driving motor of the optics driving unit 11. Furthermore, a result of the calculation of AF may be output to the optics driving unit 11 to relocate the focus lens along an optic axis. AWB, AE, and AF may be automatically applied, or selectively applied by a user to an input image signal.

A signal processing unit 32 performs predetermined image signal processing on an image signal to display or record the image signal. For example, the signal processing unit 32 may perform image signal processing on an image signal to modify the image signal in a preferred manner, such as to achieve a desired effect, for example, gamma correction, color filter array interpolation, color matrix, color correction, color enhancement, and the like. Furthermore, the signal processing unit 32 may also perform a resizing or cropping process to adjust the size and/or dimensions of an image.

Furthermore, the signal processing unit 32 may perform signal processing for performing particular functions. For example, signal processing to detect a desired scene or object within a scene may be performed with respect to an image signal. A desired scene or object may be detected by using information regarding color components, edge components, and/or feature points of the image signal. For example, the face of a person may be detected in the image signal and a face region including the detected face may be located in the image signal.

Furthermore, the signal processing unit 32 may perform compression and decompression on an image signal directly, or on which image signal processing has already been performed. For example, in the case of compression, the signal processing unit 32 may compress an image signal into a compression format, such as a JPEG compression format or H.264 compression format. An image file containing image data generated through a compression process may be transmitted to the memory card 70 via a card control unit 38 to be stored therein. In an illustrative embodiment, a frame imaging unit may include the imaging device 20 and may generate a frame image. The frame imaging unit may also, or alternatively, include the pre-processing unit 31 and/or the signal processing unit 32. The frame image may be based on image data on which at least one image signal process has been performed by the pre-processing unit 31 and/or the signal processing unit 32. With respect to operations for tracking an object in the frame image and controlling an image capturing operation based thereon, the frame image may be provided by the imaging device 20, the pre-processing unit 31, or the signal processing unit 32. In other words, for any of various reasons such as the processing speed(s) of an object tracking unit 35 and/or a CPU 36, the capacity of the memory 60, and the efficiency of chip arrangement, the frame imaging unit may include any of the imaging device 20, the pre-processing unit 31, and the signal processing unit 32.

The DSP 30 may include a display control unit 34. The display control unit 34 controls operations to display an image and/or information on the display unit 40. The display unit 40 may include a liquid crystal display (LCD) device, a light-emitting diode (LED) display device, an organic light-emitting display (OLED) device, or the like.

The DSP 30 includes an object tracking unit 35, which tracks motions of a moving object. Furthermore, the DSP 30 includes a CPU 36 that controls overall operations of each of components of the digital photographing apparatus 100. The CPU 36 and the DSP 30 may be embodied as a single chip or as separate chips. Detailed descriptions of the object tracking unit 35 and the CPU 36 will be given hereinafter with reference to corresponding drawings.

The DSP 30 includes a memory control unit 37 to control the memory 60, to which data of a captured image and/or image information may be temporarily written. Furthermore, the DSP 30 includes the card control unit 38, which writes a captured image to the memory card 70 or reads out a stored image from the memory card 70. The card control unit 38 controls writing of image data to the memory card 70 or reading out of image data or setup information stored in the memory card 70.

Furthermore, the digital photographing apparatus includes the manipulation unit 50, via which a user may input various control signals. The manipulating unit 50 may include a component for setting various options for operating the digital photographing apparatus and capturing an image. For example, the manipulating unit 50 may include buttons, keys, a touch panel, a touch screen, or a dial, and user control signals for various functions, such as turning power on/off, starting/stopping photographing, starting/stopping/searching playback, driving optics, switching mode, operating menus, and operating selections, may be input via the manipulation unit 50. For example, a shutter button may be half-pressed, fully pressed, or released by a user. An operation signal for starting focus control may be output when a shutter button is half-pressed (step S1), and the focus control may be terminated when the shutter button is released. The shutter button may output an operation signal for starting photographing when the shutter button is fully pressed (step S2). The operation signals may be transmitted to the CPU 36 of the DSP 30, and thus corresponding components may be driven.

The memory 60 may include a program storage unit for storing an operating system (OS) and application programs for operating the digital photographing apparatus. Examples of the program storage unit include an EEPROM, a flash memory, and a ROM. Furthermore, the memory 60 may include a buffer memory for temporarily storing image data of a captured image. Examples of the buffer memory include a SDRAM or a DRAM. The buffer memory may store image data of a plurality of images in sequential order, and may output image signals in the sequential order. Furthermore, the memory 60 may include a display memory having at least one channel for displaying a first display image or a second display image. The display memory may simultaneously input and output image data to and from a display driving unit included in the display unit 40. The size and the maximum number of displayable colors depend on the capacity of the display memory.

The memory card 70 may be coupled to and uncoupled from the digital photographing apparatus, and may include an optical disc (a CD, a DVD, a Blu-ray disc, or the like), an optical-magnetic disk, a magnetic disk, or a semiconductor memory.

Hereinafter, the object tracking unit 35 and the CPU 36 as shown in FIG. 1 will be described in closer detail with reference to FIGS. 2 through 5.

Figure 2:
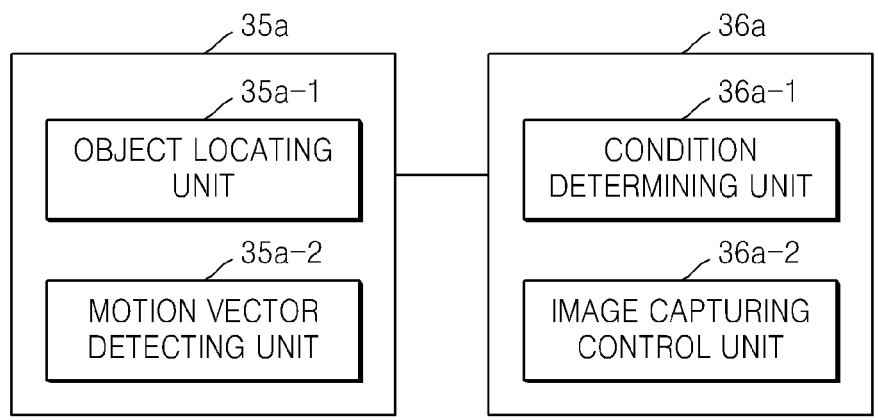
FIG. 2 is a block diagram of an object tracking unit and a CPU according to an embodiment.

FIG. 2 is a block diagram of an object tracking unit and a CPU according to an embodiment. An object tracking unit 35a according to the present embodiment includes an object locating unit 35a-1 that locates a particular object in a frame image provided by the frame imaging unit described above with reference to FIG. 1. Furthermore, the object tracking unit 35a includes a motion vector detecting unit 35a-2 that detects a motion vector of a particular object. Locating a particular object and detecting a motion vector of the located object may be sequentially performed. For example, when a user selects an object via the manipulation unit 50, the object locating unit 35a-1 may locate the object corresponding to the selection. For example, a user may select a desired face region from among face regions recognized via a face recognition algorithm, and the person corresponding to the selected face region may be located. However, the present invention is not limited thereto. For example, a feature and a motion vector of an object may be detected via substantially the same algorithm by locating a moving object and detecting a motion vector with respect to the motion of the moving object simultaneously. A motion vector may be detected by using a block matching algorithm, 2-dimensional logarithmic search, orthogonal search, cross search, 3-step search, 1-dimensional full search, modified 3-step search, or the like.

The motion vector detecting unit 35a-2 may detect a sum vector of motion vectors within an object region including at least a portion of a particular object. A predetermined determination may be made with respect to the sum vector.

Furthermore, a CPU 36a according to the present embodiment may include a condition determining unit 36a-1 and an image capturing control unit 36a-2. The condition determining unit 36a-1 may determine whether the sum vector meets a predetermined condition. If so, a plurality of conditions may be set.

If the sum vector meets the predetermined condition, the image capturing control unit 36a-2 generates an image capturing signal. A frame image input in synchronization with the image capturing signal is captured and stored as an image file. In other words, the image capturing signal is a signal to control capturing a frame image and to record and store the frame image as an image file.

Figure 3:
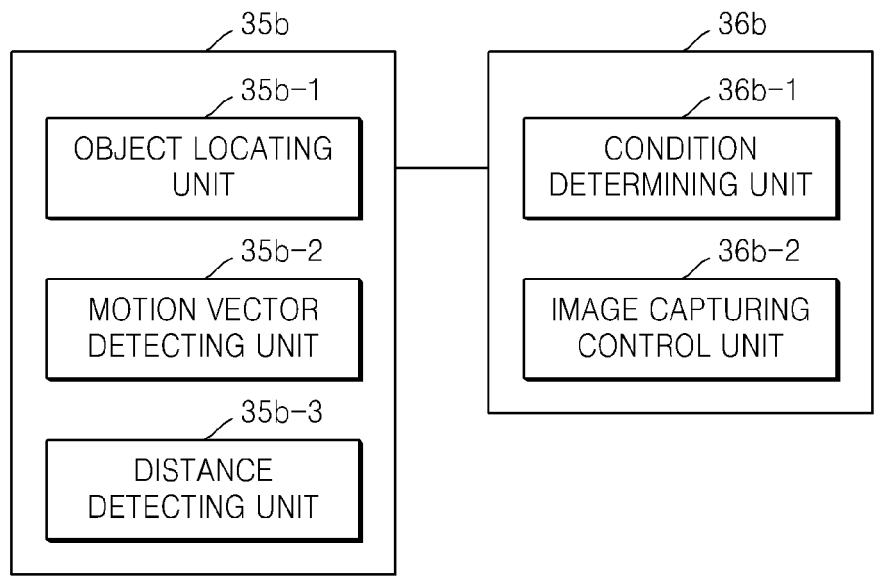
FIG. 3 is a block diagram of an object tracking unit and a CPU according to another embodiment.

FIG. 3 is a block diagram of an object tracking unit and a CPU according to another embodiment. An object tracking unit 35b according to the present embodiment includes an object locating unit 35b-1 that locates a particular object in a frame image provided by the frame imaging unit described above with reference to FIG. 1. In the present embodiment, when a frame image including a plurality of objects is generated by the frame imaging unit, each of the plurality of objects may be located.

Furthermore, the object tracking unit 35b includes a motion vector detecting unit 35b-2 that detects a motion vector of each of the plurality of objects.

Furthermore, the motion vector detecting unit 35b-2 may also detect a sum vector of motion vectors within an object region including at least a portion of an object. In other words, a sum vector of each of the plurality of objects may be detected.

Furthermore, the object tracking unit 35b includes a distance detecting unit 35b-3 that detects distances between the motion vectors or the sum vectors.

Furthermore, a CPU 36b according to the present embodiment may include a condition determining unit 36b-1. The condition determining unit 36b-1 may determine whether a distance detected by the distance detecting unit 35b-3 is within a reference distance range. If the detected distance is within the reference distance range, an image capturing control unit 36b-2 generates an image capturing signal. A frame image input in synchronization with the image capturing signal is captured and stored as an image file.

Alternatively, the condition determining unit 36b-1 may determine whether the motion vectors or the sum vectors contact each other. In this case, the object tracking unit 35b may not include the distance detecting unit 35b-3. If the motion vectors or the sum vectors contact each other, the image capturing control unit 36b-2 may generate an image capturing signal.

The conditions may be set by a user.

Figure 4:
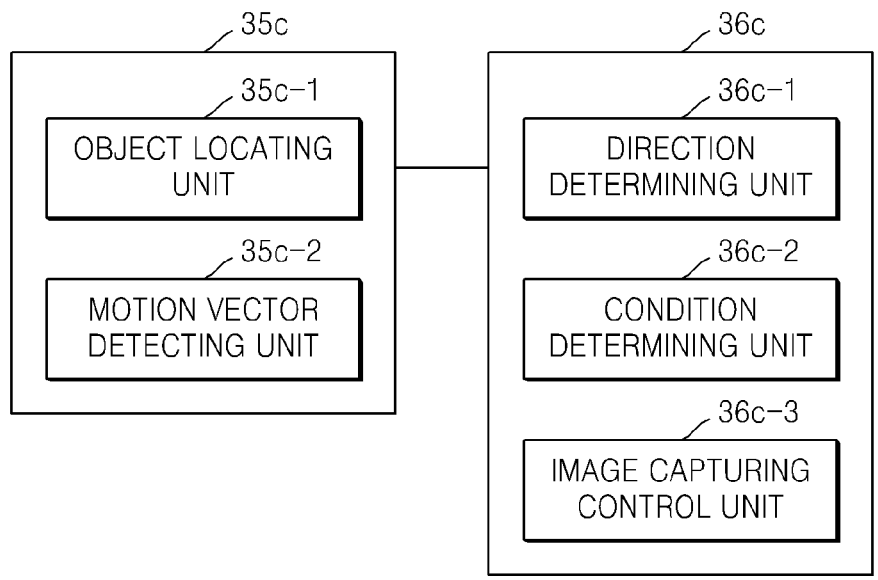
FIG. 4 is a block diagram of an object tracking unit and a CPU according to another embodiment.

FIG. 4 is a block diagram of an object tracking unit and a CPU according to another embodiment. A plurality of conditions for determining motion vectors are set to generate an image capture signal. Descriptions that follow will focus on differences between the object tracking unit 35a and the CPU 36a shown in FIG. 2 and an object tracking unit 35c and a CPU 36c according to the present embodiment.

The object tracking unit 35c according to the present embodiment includes an object locating unit 35c-1 that locates a particular object in a frame image provided by the frame imaging unit described above with reference to FIG. 1. In the present embodiment, when a frame image including a plurality of objects is generated by the frame imaging unit, each of the plurality of objects may be located.

Furthermore, the object tracking unit 35b includes a motion vector detecting unit 35b-2 that detects a motion vector of each of the plurality of objects.

Furthermore, the motion vector detecting unit 35b-2 may also detect a sum vector of motion vectors within an object region including at least a portion of an object. In other words, a sum vector of each of the plurality of objects may be detected.

Furthermore, the CPU 36c includes a direction determining unit 36c-1. The direction determining unit 36c-1 determines whether directions of the motion vectors or the sum vectors are the same. Here, vectors in the same direction or different directions not only include vectors in precisely the same direction or opposite directions, but also includes vectors in substantially the same direction or opposite directions. Furthermore, the term 'substantially the same direction' means all directions that are within a predetermined angle from the same direction or opposite directions. The predetermined angle may be set based on results of experiments or usage experiences, or may be set to secure a predetermined level of reliability or user convenience.

Furthermore, the CPU 36c may include a condition determining unit 36c-2. The condition determining unit 36c-2 may determine whether the motion vectors or the sum vectors contact each other.

Moreover, the CPU 36c may include an image capturing control unit 36c-3 that generates an image capturing signal based on determinations of the direction determining unit 36c-1 and the condition determining unit 36c-2.

Illustratively, an image capturing signal may be generated when the motion vectors or the sum vectors have the same direction and contact each other. For example, when a running man kicks a ball moving in the direction in which the running man moves, an image capturing signal may be generated when a motion vector of the running man and a motion vector of the moving ball have substantially the same direction and contact each other to effectively capture a first scene in which the running man kicks the ball.

Alternatively, an image capturing signal may be generated when the motion vectors or the sum vectors have different directions and contact each other. For example, when a running man kicks a ball that is moving toward the running man, an image capturing signal may be generated when a motion vector of the running man and a motion vector of the moving ball have different directions and contact each other to effectively capture a second scene in which the running man kicks the ball.

Figure 5:
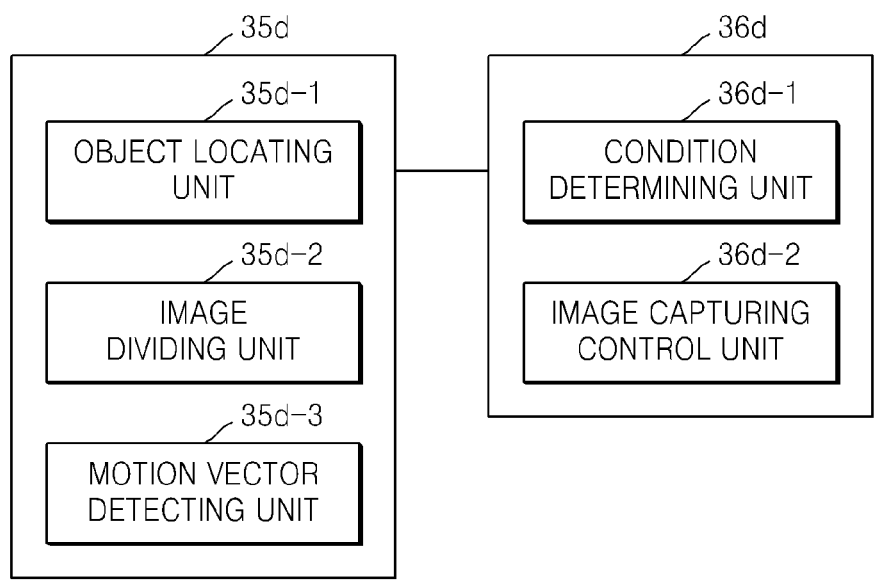
FIG. 5 is a block diagram of an object tracking unit and a CPU according to another embodiment.

FIG. 5 is a block diagram of an object tracking unit and a CPU according to another embodiment. A frame image is divided into a plurality of regions, and an image capturing signal is generated by using motion vectors corresponding to each of the divided regions. Descriptions that follow will focus on differences between the object tracking unit 35a and the CPU 36a shown in FIG. 2 and an object tracking unit 35d and a CPU 36d according to the present embodiment.

The object tracking unit 35d according to the present embodiment includes an object locating unit 35d-1 that locates a particular object in a frame image provided by the frame imaging unit. The object tracking unit 35d includes an image dividing unit 35d-2 that divides the frame image into a plurality of blocks.

The object tracking unit 35d also includes a motion vector detecting unit 35d-3 that detects a motion vector of each of the plurality of blocks. The motion vector detecting unit 35d-3 may also detect a sum vector of motion vectors within an object region including at least a portion of an object.

The CPU 36d includes a condition determining unit 36d-1. The condition determining unit 36d-1 may determine whether the motion vectors or the sum vectors meet a predetermined condition.

Although motion vectors are used in descriptions that follow, sum vectors may be used instead of the motion vectors.

The predetermined condition may be whether the motion vectors converge or diverge or whether the motion vectors are combined or separated. For example, each of a plurality of provided sequential frame images may be divided into a plurality of blocks, and motion vectors of an object in each of the blocks may be detected. It may be determined based on the condition whether motion vectors in a previous frame image and a current frame image approach each other, that is, converge. Alternatively, it may be determined whether the motion vectors in the previous frame image and the current frame image recede from each other, that is, diverge. Alternatively, it may be determined whether the motion vectors in the previous frame image and the current frame image are combined to each other. Alternatively, it may be determined whether the motion vectors in the previous frame image and the current frame image are separated from each other.

Figure 6:
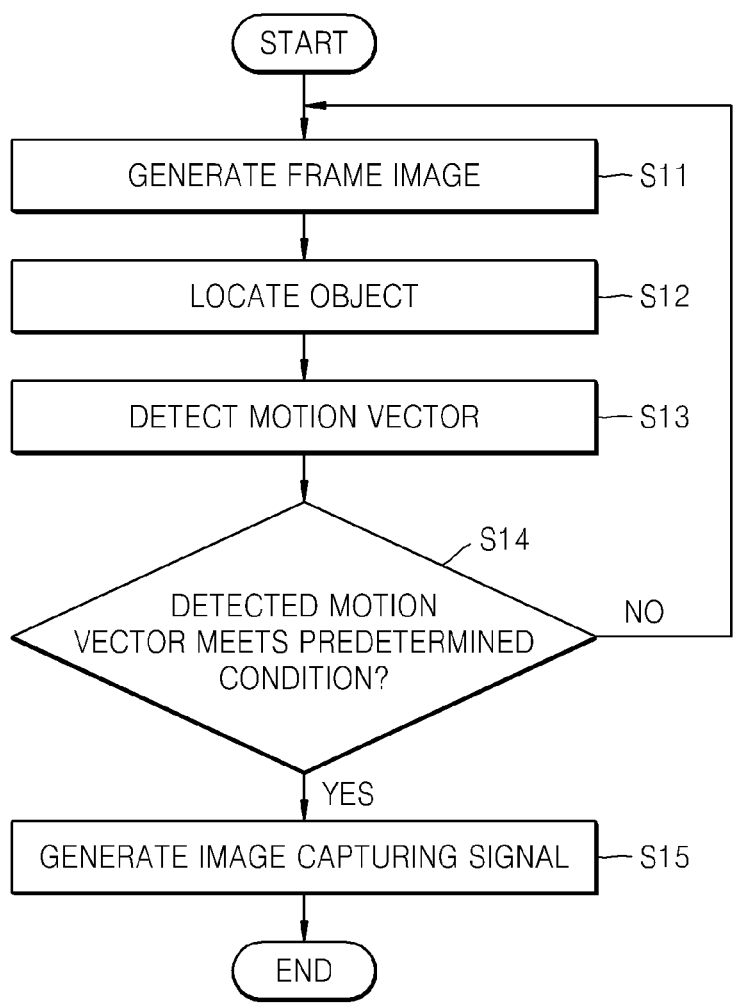
FIG. 6 is a flowchart of a digital photographing method according to an embodiment.

FIG. 6 is a flowchart of a digital photographing method according to an embodiment. A frame image including at least one object is generated (step S11). For example, a frame image input in a live-view mode in real time may be generated.

At least one object is located in the frame image (step S12). The object may be located either by an operating signal from a user or by using an object tracking algorithm. Detection of motion vectors may be performed substantially at the same time. Locating an object may not be necessarily performed before detection of motion vectors.

Motion vectors are detected with respect to the object (step S13). A sum vector as a sum of at least two motion vectors from among motion vectors detected with respect to the object may be detected. Illustratively, motion vectors may include the sum vector.

It is determined whether the detected motion vectors meet a predetermined condition (step S14). The condition may be set by a user. If the predetermined condition is not met, a next frame image is generated (step S11). If the predetermined condition is met, an image capturing signal is generated (step S15). According to the image capturing signal, the input frame image is stored in an image file.

Figure 7:
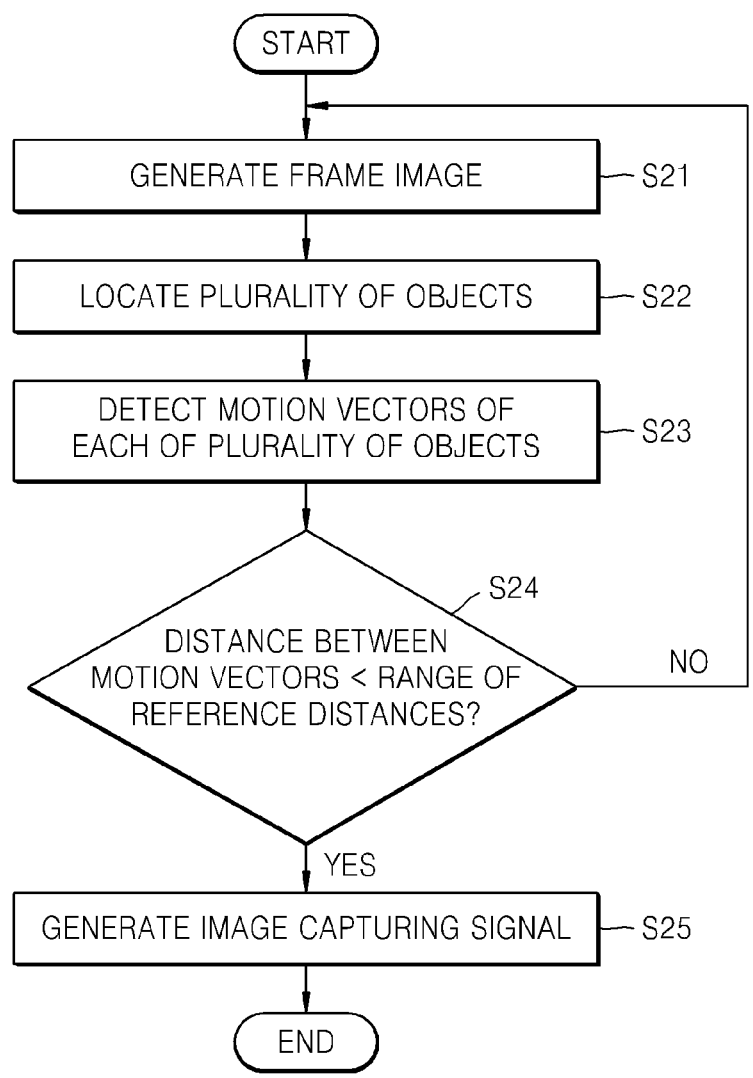
FIG. 7 is a flowchart showing a digital photographing method according to another embodiment.

FIG. 7 is a flowchart showing a digital photographing method according to another embodiment. Compared to the method shown in FIG. 6, it is determined whether a predetermined condition is met based on a distance between motion vectors in the present embodiment. Descriptions that follow will focus on differences between the embodiment shown in FIG. 6 and the present embodiment.

A frame image including a plurality of objects is generated (step S21). A plurality of objects are located in the frame image (step S22). Motion vectors of each of the plurality of objects are detected (step S23). A sum vector as a sum of at least two motion vectors detected with respect to the object may be detected.

It is determined whether a distance between the motion vectors of each of the plurality of objects is within a reference distance range (step S24). If the distance is within the reference distance range, an image capturing signal is generated (step S24). If not, a next frame image is generated (step S21), and the steps stated above are repeated.

Figure 8:
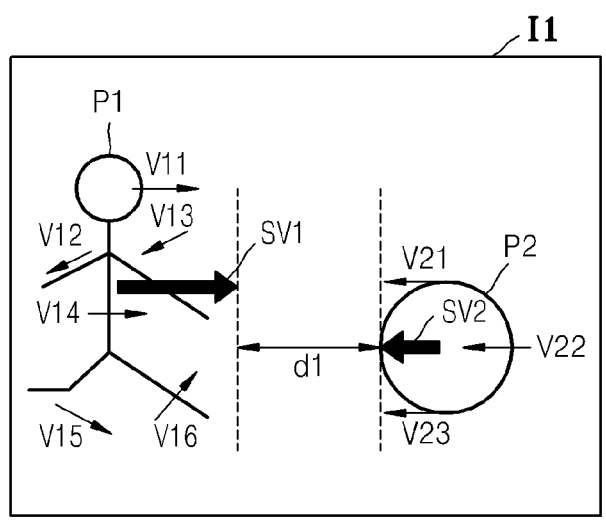
FIGS. 8 and 9 are diagrams illustrating the digital photographing method of FIG. 7, that is, examples of generating image capturing signals based on a distance between objects.
Figure 9:
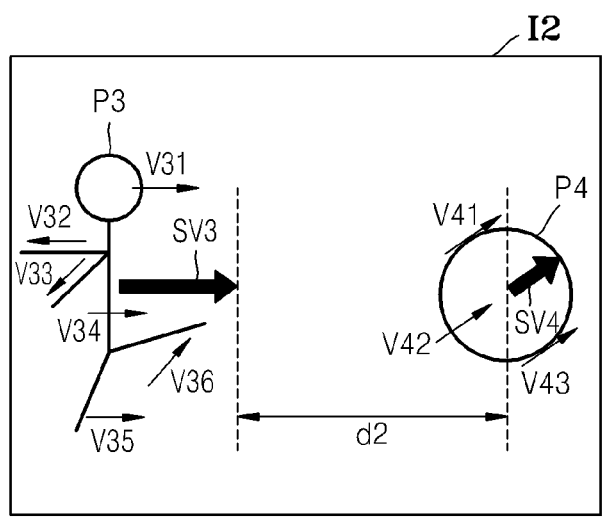

FIGS. 8 and 9 are diagrams showing examples of the digital photographing method shown in FIG. 7, that is, examples of generating image capturing signals based on a distance between objects.

FIG. 8 shows a first frame image I1 including a man P1 who is about to kick a ball P2, and the ball P2 moving toward the man P1. Motion vectors of the man P1 and the ball P2 are detected. With respect to the man P1 as a first object, six motion vectors V11 through V16 may be detected, and a first sum vector SV1 as a sum of the six motion vectors V11 through V16 may be detected. With respect to the ball P2 as a second object, three motion vectors V21 through V23 may be detected, and a second sum vector SV2 as a sum of the three motion vectors V21 through V23 may be detected. Next, a distance d1 between the first sum vector SV1 and the second sum vector SV2 is detected, and, if the distance d1 is within a reference distance range, an image capturing signal may be generated. Thereby, an image of a scene in which the man P1 is about to kick the ball P2 may be acquired.

FIG. 9 shows a second frame image I2 including a man P3 who has kicked a ball P4 and the ball P4 moving away from the man P3. With respect to the man P3 as a first object, six motion vectors V31 through V36 may be detected, and a third sum vector SV3 as a sum of the six motion vectors V31 through V36 may be detected. With respect to the ball P4 as a second object, three motion vectors V41 through V43 may be detected, and a fourth sum vector SV4 as a sum of the three motion vectors V41 through V43 may be detected. Next, a distance d2 between the third sum vector SV3 and the fourth sum vector SV4 is detected, and, if the distance d2 is within a reference distance range, an image capturing signal may be generated. Thereby, an image of a scene in which the man P3 has kicked the ball P4 may be acquired.

The distance d1 indicates a horizontal distance between the first sum vector SV1 and the second sum vector SV2, and the distance D2 indicates a horizontal distance between the third sum vector SV3 and the fourth sum vector SV4. However, the present invention is not limited thereto, and the distance d1 and the distance d2 may indicate vertical distances or combinations of horizontal distances and vertical distances.

Figure 10:
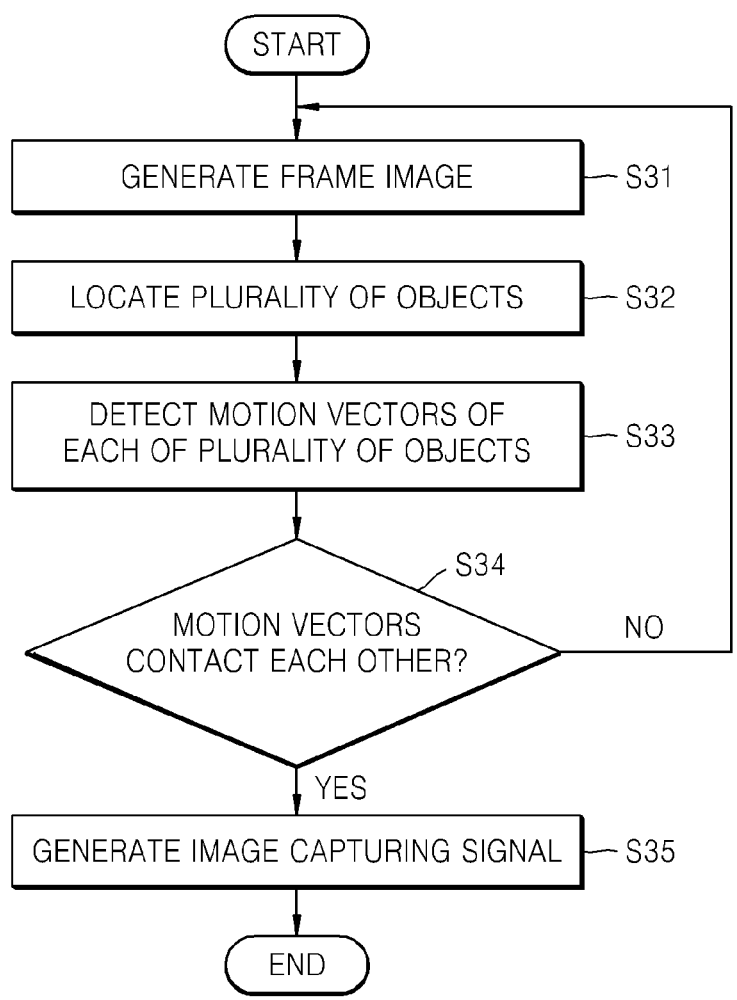
FIG. 10 is a flowchart showing a digital photographing method according to another embodiment.

FIG. 10 is a flowchart showing a digital photographing method according to another embodiment. Compared to the method shown in FIG. 6, it is determined whether a predetermined condition is met based on whether motion vectors contact each other in the present embodiment. Descriptions that follow will focus on differences between the embodiment shown in FIG. 6 and the present embodiment.

Figure 11:
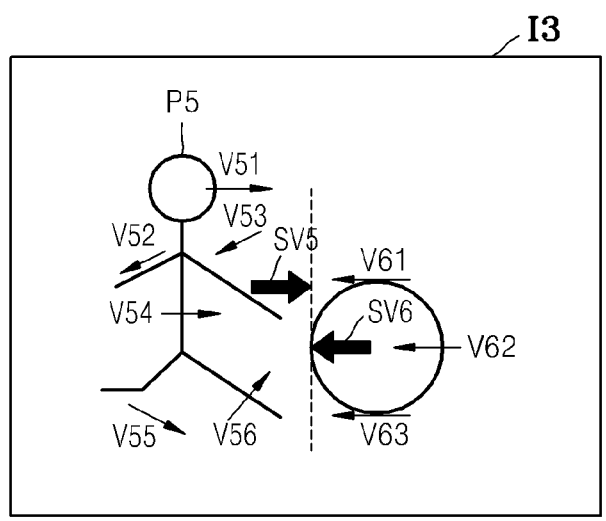
FIGS. 11 and 12 are diagrams illustrating generating image capturing signals when objects contact each other.
Figure 12:
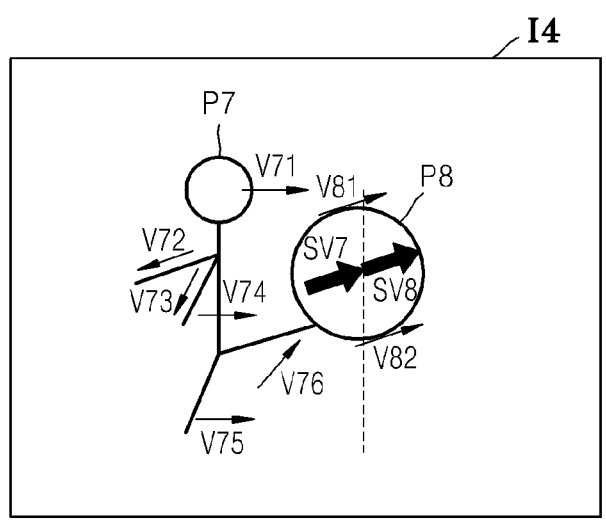

Referring to FIG. 10, a frame image including a plurality of objects is generated (step S31). A plurality of objects are located in the frame image (step S32). Motion vectors of each of the plurality of objects are detected (step S33). It is determined whether the motion vectors of each of the plurality of objects contact each other (step S34). If the motion vectors do not contact each other, the method may proceed back and generate a next frame image (the step 31). Examples of the digital photographing method shown in FIG. 10 will be described hereinafter in detail with reference to FIGS. 11 and 12. FIGS. 11 and 12 are diagrams showing examples of generating image capturing signals when objects contact each other.

FIG. 11 shows a first frame image I3 including a man P5 who is about to kick a ball P6, and the ball P6 moving toward the man P5. Motion vectors of the man P5 and the ball P6 are detected. With respect to the man P5 as a first object, six motion vectors V51 through V56 may be detected, and a fifth sum vector SV5 as a sum of the six motion vectors V51 through V56 may be detected. With respect to the ball P6 as a second object, three motion vectors V61 through V63 may be detected, and a sixth sum vector SV6 as a sum of the three motion vectors V61 through V63 may be detected. If the fifth sum vector SV5 and the sixth sum vector SV6 contact each other, an image capturing signal may be generated. Thereby, an image of a scene in which the man P5 contacts the ball P6 may be acquired.

FIG. 12 shows a second frame image I4 including a man P7 who has kicked a ball P8, and the ball P8 moving away from the man P7. With respect to the man P7 as a first object, six motion vectors V71 through V76 may be detected, and a seventh sum vector SV7 as a sum of the six motion vectors V71 through V76 may be detected. With respect to the ball P8 as a second object, three motion vectors V81 through V83 may be detected, and a eighth sum vector SV8 as a sum of the three motion vectors V81 through V83 may be detected. If the seventh sum vector SV7 and the eighth sum vector SV8 contact each other, an image capturing signal may be generated. Thereby, an image of a scene in which the man P7 contacts the ball P8 before the man P7 and the ball P8 are separated from each other may be acquired.

Figure 13:
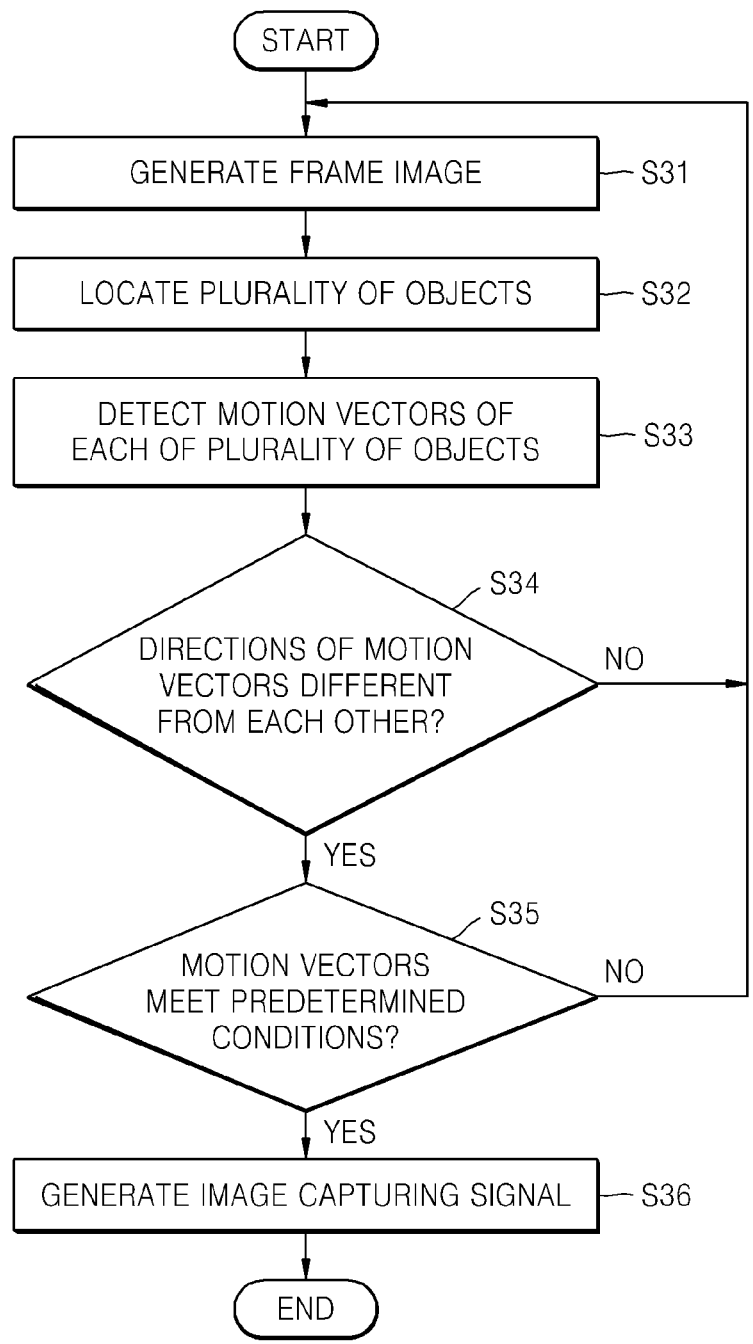
FIG. 13 is a flowchart showing a digital photographing method according to another embodiment.

FIG. 13 is a flowchart showing a digital photographing method according to another embodiment. Compared to the method shown in FIG. 6, it is determined whether a plurality of predetermined conditions are met in the present embodiment. Descriptions that follow will focus on differences between the embodiment shown in FIG. 6 and the present embodiment.

Referring to FIG. 13, a frame image including a plurality of objects is generated (step S31). A plurality of objects are located in the frame image (step S32). Motion vectors of each of the plurality of objects are detected (step S33).

It is determined whether directions of the motion vectors of the plurality of objects are different from each other (step S34). If the directions of the motion vectors of the plurality of objects are different from each other, it is determined whether the motion vectors of the plurality of objects meet predetermined conditions (step S35).

If the directions of the motion vectors of the plurality of objects are different from each other and the motion vectors of each of the plurality of objects meet the predetermined conditions, an image capturing signal may be generated (step S36). The predetermined conditions may be whether the motion vectors contact each other or whether a distance between the motion vectors is within a reference distance range, for example.

If a photographer wants to capture a scene in which a running man kicks a ball moving toward the running man, the desired scene may be captured more reliably by determining not only whether motion vectors of the running man and the ball contact each other, but also determining whether directions of the motion vectors of the running man and the ball are different from each other. If the directions of the motion vectors of each of the plurality of objects are not different from each other or the motion vectors do not meet the predetermined conditions, the method may proceed back and generate a next frame image (the step 31).

Alternatively, it may be determined whether the directions of the motion vectors of the plurality of objects are the same (step S34). If the directions of the motion vectors of the plurality of objects are the same, it is determined whether the motion vectors of the plurality of objects meet predetermined conditions (step S35). If the directions of the motion vectors of the plurality of objects are the same and the motion vectors of each of the plurality of objects meet the predetermined conditions, an image capturing signal may be generated (step S36). The predetermined conditions may be whether the motion vectors contact each other or whether a distance between the motion vectors is within a reference distance range, for example.

If a photographer wants to capture a scene in which a running man has kicked a ball, the desired scene may be captured more reliably by determining whether directions of motion vectors of the running man and the ball are the same.

Figure 14:
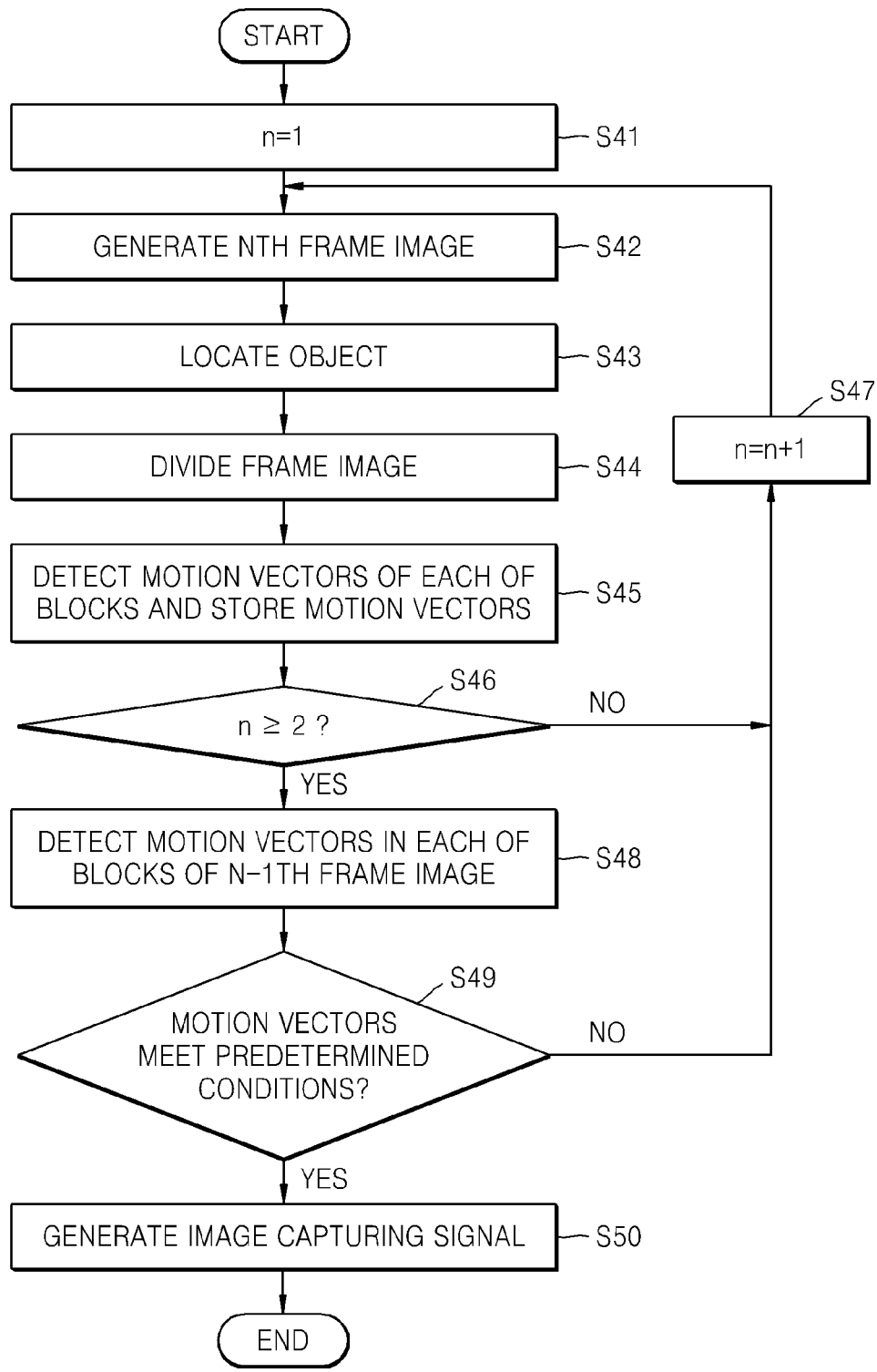
FIG. 14 is a flowchart showing a digital photographing method according to another embodiment.

FIG. 14 is a flowchart showing a digital photographing method according to another embodiment. Compared to the method shown in FIG. 6, an image capturing signal is generated based on an analysis of developments of motion vectors between a previous frame image and a current frame image. Descriptions that follow will focus on differences between the embodiment shown in FIG. 6 and the present embodiment.

Referring to FIG. 14, a counter n begins at n=1 (step S41), and a frame image is generated (step S42). The first frame image may include at least one object. An object is located in the first frame image (step S43). The first frame image is divided into a plurality of blocks (step S44). Motion vectors of each of the plurality of blocks are detected, and the detected motion vectors are stored (step S45). The motion vector includes a sum vector as a sum of at least two motion vectors detected with respect to each of the plurality of blocks.

The order in which the step of locating an object, the step of dividing a frame image, and the step of detecting motion vectors are performed may be changed, or two or more of the steps may be performed simultaneously. For example, an object may be located and motion vectors thereof may be detected at the same time.

It is determined whether the value of n is equal to or greater than 2 (step S46). If the value of n is less than 2, 1 is added to the current value of n (step S47). Since in that case the current value of n must be 1, 1 is added to the current value of n, making n=2. Next, a second frame image is generated (step S42). Although a current frame image and a frame image immediately previous to the current frame image are compared in the present embodiment, the present invention is not limited thereto, and a current frame image and any of frame images previous to the current frame image may be compared.

If the current value of n is equal to or greater than 2, the second frame image may be divided into a plurality of blocks, and motion vectors of the object may be detected with respect to each of the plurality of blocks and temporarily stored. The motion vectors of the object in each of the plurality of blocks of the first frame image may then be extracted (step S48).

It is determined whether the motion vectors of the object in each of the plurality of blocks of the second frame image and the motion vectors of the object in each of the plurality of blocks of the first frame image meet predetermined conditions (step S49). If the motion vectors of the object in each of the plurality of blocks of the second frame image and the motion vectors of the object in each of the plurality of blocks of the first frame image meet the predetermined conditions, an image capturing signal is generated (step S50). If not, 1 is added to the current value of n (step 47), and the steps stated above may be repeated on a new frame image.

Figure 15:
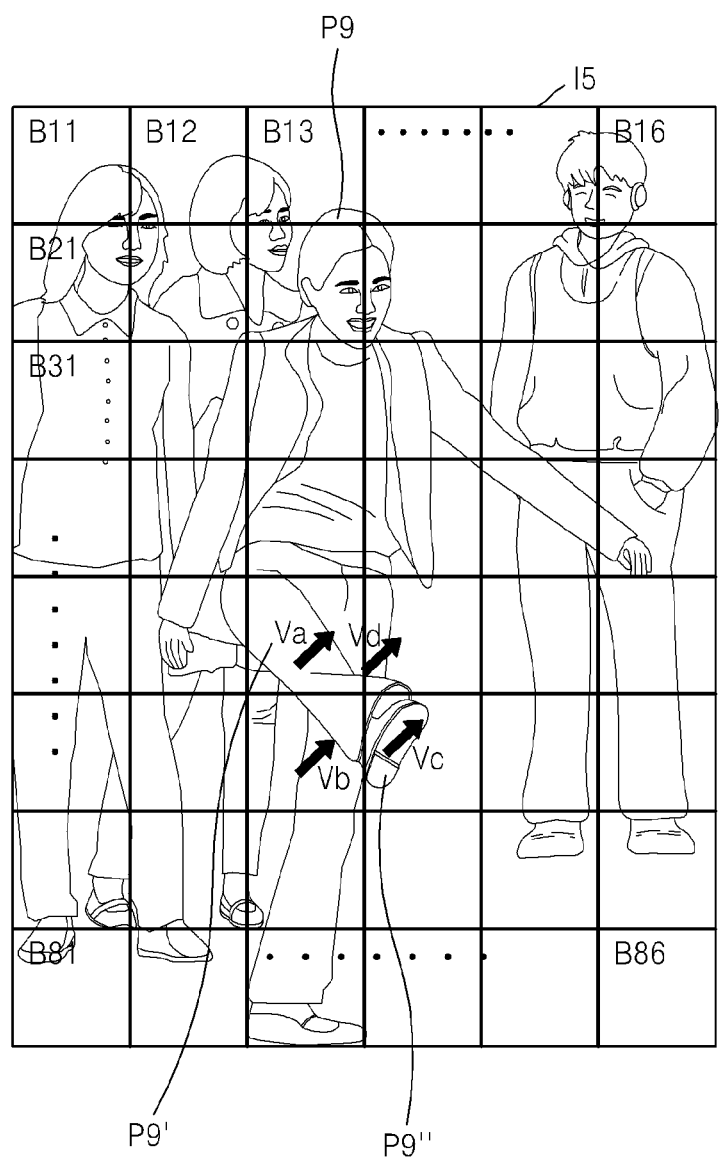
Figure 16:
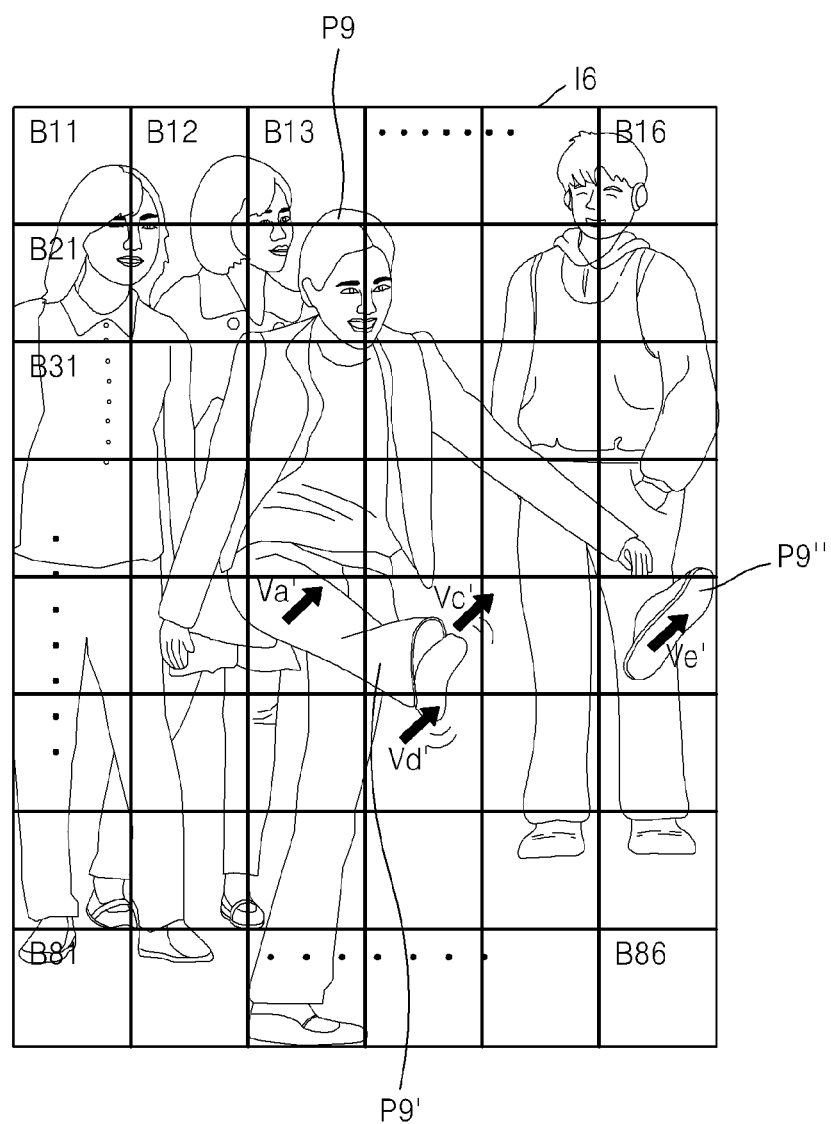

The predetermined condition may be whether the motion vectors converge or diverge, or whether the motion vectors are combined or separated. If the predetermined conditions are met, an image capturing signal may be generated. Detailed descriptions of the conditions as stated above will be given hereinafter. FIGS. 15 and 16 are diagrams of a method of capturing a scene in which an object is separated into two objects.

In FIG. 15, a fifth frame image I5 shows a scene in which a woman P9 plays kickball. The fifth frame image I5 may be divided into 6×8 blocks B11 through B16, B21 through B26, . . . and B81 through B86. In the fifth frame image I5, a leg P9' and the shoe P9" of the woman P9 are located as objects, and motion vectors of the objects in each of the blocks are detected. In the fifth frame image I5, motion vectors Va, Vb, Vc, and Vd of the objects in the blocks B53, B63, B54, and B64 are detected.

In FIG. 16, a sixth frame image I6 shows a scene in which the shoe P9" has come off from the foot of the woman P9. In the sixth frame image I6, motion vectors of the objects in each of the blocks are detected. In the sixth frame image I6, motion vectors Va', Vc', Vd', and Ve' of the objects in the blocks B53, B54, B64, and B56 are detected.

When the fifth frame image I5 and the sixth frame image I6 are compared, the fifth frame image I5 includes the motion vector Vb of the block B63, but the sixth frame image I6 does not include a corresponding motion vector Vb, and a new motion vector Ve' of the block B56 is generated in the sixth frame image I6. The fifth frame image I5 includes motion vectors with respect to each of the blocks B53, B63, B54, and B64 adjacent to each other, but the sixth frame image I6 includes a motion vector of an object in the block B56, which is at least one block apart from the group of adjacent blocks B53, B54, and B64, and thus it may be determined that an object has divided into multiple objects. In the sixth frame image I6, if blocks in which motion vectors of an object are detected are at least one block apart from each other, it may be determined that the object has divided into multiple objects.

Furthermore, when directions of the motion vectors are further determined and a direction of a motion vector of at least one of the group of adjacent blocks B53, B64, and B63 in the sixth frame image I6 is the same as a direction of a motion vector of the other block B56 apart from the adjacent blocks B53, B64, and B63, it may be determined that an object has separated into multiple objects. If a direction of a motion vector of the block B54, which is closest to the other block B56 from among the group of adjacent blocks B53, B64, and B63, is the same as a direction of a motion vector of the other block B56, for example the motion vector Ve', it may be determined that an object has separated into multiple objects.

Directions of motion vectors may be determined with respect to a current frame image and an immediately preceding frame image, or an earlier frame image, or a plurality of previous frame images. The same may be equally applied to other embodiments.

Examples in which a plurality of objects converge will be described hereinafter with reference to FIGS. 17 and 18. For convenience of explanation, FIGS. 17 and 18 do not show objects but only show motion vectors that correspond to objects.

Figure 17:
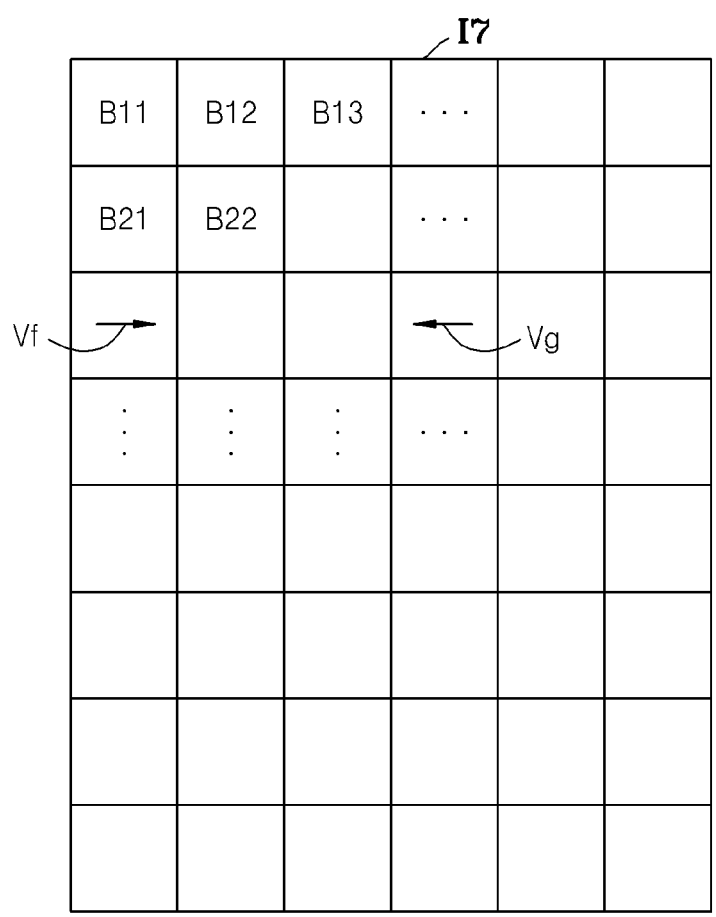
Figure 18:
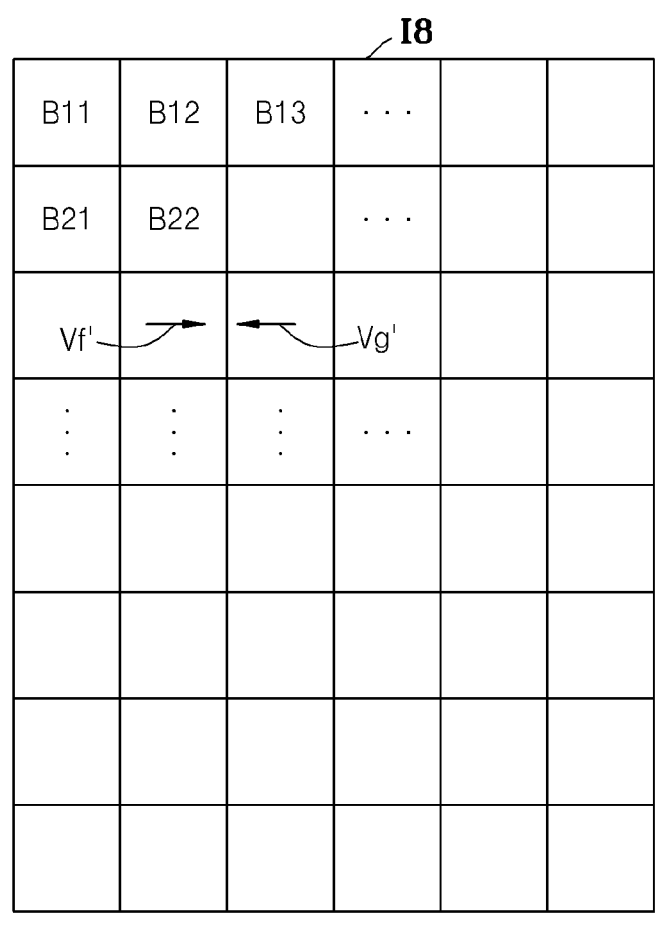

Referring to FIG. 17, a motion vector Vf corresponding to a first object (not shown) in block B31, and a motion vector Vg corresponding to a second object (not shown) in block B44 are detected in a seventh frame image I7. Two blocks B32 and B33 exist between the motion vector Vf and the motion vector Vg. In FIG. 18, a motion vector Vf' corresponding to the first object in the block B32 and a motion vector Vg' corresponding to the second object in the block B33 are detected.

Since a number of blocks between the motion vector Vf' and the motion vector Vg' is less than a number of blocks between the motion vector Vf and the motion vector Vg, it may be determined that the first object and the second object converge and an image capturing signal may be generated based on the determination.

In the present embodiment, in addition to the determination of whether the number of blocks between the motion vector Vf' and the motion vector Vg' is less than the number of blocks between the motion vector Vf and the motion vector Vg, it may be further determined whether the direction of the motion vector Vf' and the direction of the motion vector Vg' are opposite to each other, and, if the direction of the motion vector Vf' and the direction of the motion vector Vg' are opposite to each other, it may be determined that the first object and the second object converge. Thereby, whether objects converge may be more reliably determined.

Figure 19:
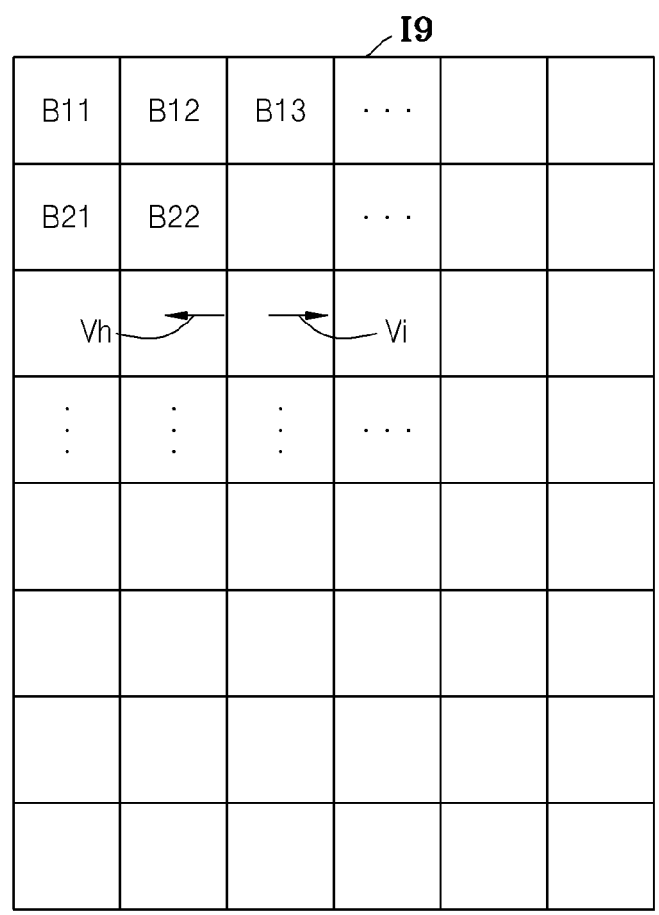
Figure 20:
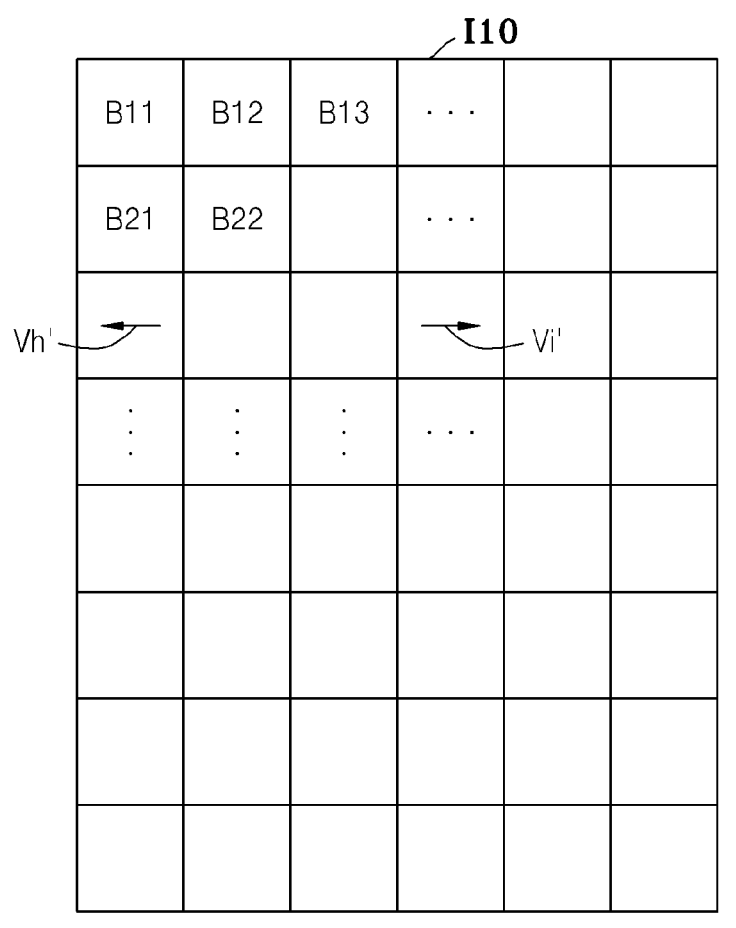

Examples in which a plurality of objects diverge will be described hereinafter with reference to FIGS. 19 and 20. Referring to FIG. 19, a motion vector Vh corresponding to a first object in a block B32, and a motion vector Vi corresponding to a second object in a block B33, are detected in a ninth frame image I9. Furthermore, in FIG. 20, as a result of detecting motion vectors with respect to a tenth frame image I10 after the ninth frame image I9, a motion vector Vh' of the first object in a block B31 and a motion vector Vi' of the second object in a block B34 are detected. Since a number of blocks between the motion vector Vh' and the motion vector Vi' is greater than a number of blocks between the motion vector Vh and the motion vector Vi, it may be determined that the objects diverge, and an image capturing signal may be generated based on the determination.

Furthermore, it may be further determined whether the direction of the motion vector Vf' and the direction of the motion vector Vg' are opposite to each other, and, if the direction of the motion vector Vf' and the direction of the motion vector Vg' are opposite to each other, it may be determined that the first object and the second object diverge. Thereby, whether objects diverge may be more reliably determined.

Figure 21:
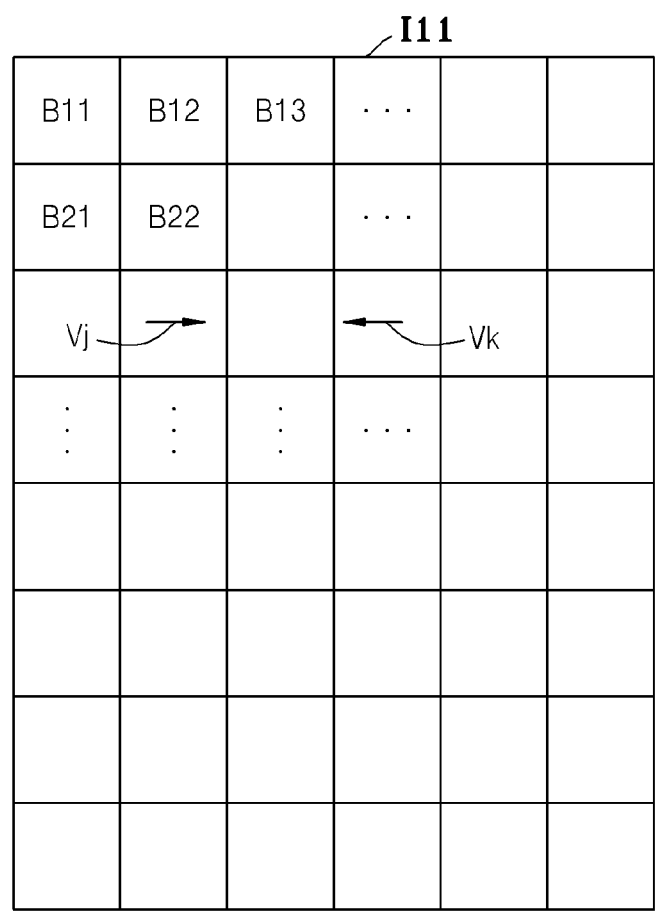
Figure 22:
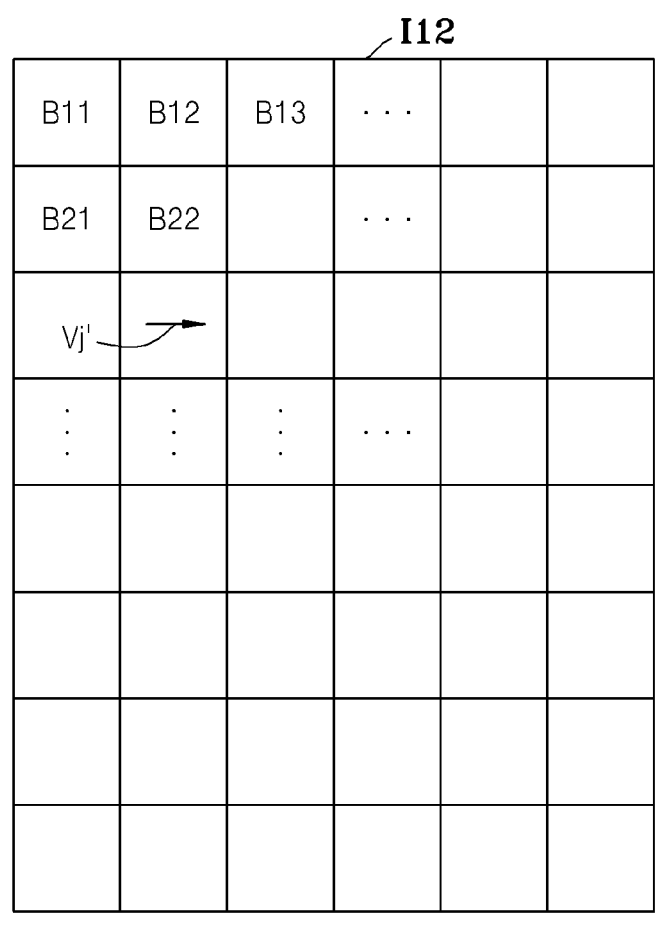

FIGS. 21 and 22 show an example in which objects are combined together. In FIG. 21 in an eleventh frame image I11, a motion vector Vj corresponding to a first object in a block B32, and a motion vector Vk corresponding to a second object in a block B43, are detected. In FIG. 22 in a twelfth frame image I12, after the eleventh frame image I11, only a single motion vector Vj' corresponding to an object in the block B32 is detected. Since blocks between the motion vector Vj and the motion vector Vk in the eleventh frame image I11 are not present in the twelfth frame image I12, it may be determined that the first object and the second object were combined together.

In the present embodiment, it may be further determined whether the direction of the motion vector Vj and the direction of the motion vector Vk are opposite to each other or not, and, if the direction of the motion vector Vj and the direction of the motion vector Vk are opposite to each other, it may be confirmed that the first object and the second object are combined. Thereby, whether objects are combined may be more reliably determined.

All documents referred to in the foregoing description, if any, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to certain embodiments illustrated in the drawings, and specific language has been used to describe these embodiments. However, no limitation of the scope of the invention is intended by these embodiments or this specific language, and the invention should be construed to encompass all embodiments that would normally occur to one of ordinary skill in the art in view of this disclosure. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable medium such as a semiconductor memory, random-access memory (RAM), read-only memory (ROM), CD-ROMs, DVDs, magnetic tapes, hard disks, floppy disks, and optical data storage devices. The computer readable media may also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains may implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various methods being implemented with any combination of data structures, objects, processes, routines or other programming elements. Functional aspects may be implemented using algorithms that execute on one or more processors. Furthermore, the invention may employ any number of conventional techniques for electronics configuration, signal processing and/or control, data processing and the like.

Finally, the steps of all methods described herein may be performed in any suitable order unless otherwise indicated herein or otherwise clearly contradicted by context.

For the sake of brevity, conventional electronics, control systems, software development, and other functional aspects of the herein described systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all embodiments within the scope of the claims will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of any ranges of values herein are merely intended to serve as a shorthand method of referring individually to each separate value falling within the range, unless otherwise indicated herein, and each separate value is incorporated into the specification as if it were individually recited herein.

What is claimed is:

1. A method for operating an electronic device comprising:
   receiving a sequence of images using an image sensor operatively coupled with the electronic device;
   identifying a first object from the sequence of images;
   identifying a second object different than the first object from the sequence of images;
   identifying a first movement state corresponding to the first object or a second movement state corresponding to the second object;
   determining, based at least in part on the first movement state or the second movement state, that a specified condition is met with respect to a proximity between the first object and the second object;
   generating an image capturing signal based on the determining that a distance between the first object and the second object is within a reference distance range; and
   photographing an image in response to the generated image capturing signal.

2. The method of claim 1, wherein the identifying the movement states comprises:
   identifying a first motion vector, based on the sequence of images, corresponding to the first object;
   identifying a second motion vector, based on the sequence of images, corresponding to the second object; and
   determining the movement states based at least in part on the first motion vector or the second motion vector.

3. The method of claim 2, wherein the identifying the movement states comprises:
   determining the movement states based at least in part on a sum vector of the first motion vector and another sum vector of the second motion vector.

4. The method of claim 1, wherein the determining that the specified condition is met further comprises:
   determining whether the first object or the second object is moving toward a specific direction.

5. The method of claim 4, further comprising:
   determining whether the first object and the second object meet each other at least one point.

6. The method of claim 1, wherein the determining that the specified condition is met further comprises:
   determining whether at least a portion of the first object or at least a portion of the second object is diverged to two or more objects.

7. The method of claim 1, wherein the determining that the specified condition is met further comprises:
   determining whether the first object and the second object is converged at least in part together.

8. The method of claim 1, wherein the identifying the first object or the second object comprises:
   dividing at least a portion of the sequence of images into a plurality of blocks; and
   selecting, as the first object or the second object, at least one block from the plurality of blocks.

9. The method of claim 2, wherein the first motion vector is a set of motion vectors corresponding to at least a portion of the first object and the second motion vector is a set of motion vectors corresponding to at least a portion of the second object.

10. An apparatus comprising:
    memory;
    an image sensor; and
    a processor configured to:
        receive a sequence of images using the image sensor;
        identify a first object from the sequence of images;
        identify a second object different than the first object from the sequence of images;
        identify a first movement state corresponding to the first object or a second movement state corresponding to the second object;
        determine, based at least on the first movement state or the second movement state, that a specified condition is met with respect to a proximity between the first object and the second object;
        generate, an image capturing signal based on the determining that a distance between the first object and the second object is within a reference distance range; and
        photograph an image in response to the generated image capturing signal.

11. The apparatus of claim 10, wherein the processor is configured to:
    identify a first motion vector, based on the sequence of images, corresponding to the first object;
    identify a second motion vector, based on the sequence of images, corresponding to the second object; and
    compare the movement states based at least in part on the first motion vector or the second motion vector.

12. The apparatus of claim 11, wherein the processor is configured to:
    compare the movement states based at least in part on a sum vector of the first motion vector and another sum vector of the second motion vector.

13. The apparatus of claim 10, wherein the processor is configured to:
    determine whether the first object or the second object is moving toward to specific direction.

14. The apparatus of claim 13, wherein the processor is configured to:
    determine whether the first object and the second object meet each other at an at least one point.

15. The apparatus of claim 10, wherein the processor is configured to:
    determine whether at least a portion of the first object or at least a portion of the second object is diverged to two or more objects.

16. The apparatus of claim 10, wherein the processor is configured to:
    determine whether the first object and the second object are converged at least in part together.

17. The apparatus of claim 10, wherein the processor is configured to:
    divide at least a portion of the sequence of images into a plurality of blocks; and
    select, as the first object or the second object, at least one block from the plurality of blocks.

18. A non-transitory computer readable medium storing instructions that, when executed by one or more processors, cause the one or more processors to perform operations comprising:
    receiving a sequence of images using an image sensor operatively coupled with the one or more processors;
    identifying a first object from the sequence of images;
    identifying a second object different than the first object from the sequence of images;
    identifying a first movement state corresponding to the first object or a second movement state corresponding to the second object;
    determining, based at least in part on the first movement state to the second movement state, that a specified condition is met with respect to a proximity between the first object and the second object;
    generating an image capturing signal based on the determining that a distance between the first object and the second object is within a reference distance range; and
    photographing an image in response to the generated image capturing signal.

* * * * *